United States Patent Office 3,121,073
Patented Feb. 11, 1964

3,121,073
METALLIFEROUS WATER-INSOLUBLE AZO-DYE-STUFFS AND PROCESS FOR PREPARING THEM
Hasso Hertel, Reinhard Mohr, and Walter Staab, all of Offenbach (Main), Germany, assignors to Farbwerke Hoechst Aktiengesellschaft vormals Meister Lucius & Brüning, Frankfurt am Main, Germany, a corporation of Germany
No Drawing. Filed Jan. 9, 1962, Ser. No. 165,213
Claims priority, application Germany Jan. 12, 1961
6 Claims. (Cl. 260—146)

The present invention relates to valuable new metalliferous water-insoluble azo-dyestuffs and to a process for preparing them, in particular it relates to complex metal compounds of water-insoluble azo-dyestuffs having the general formula selected from the group consisting of

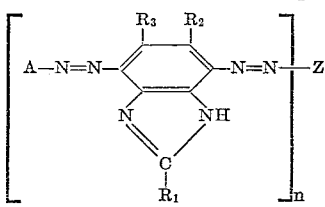

in which A represents an aromatic or heterocyclic radical, $R_1$ represents a hydrogen atom or an alkyl group, $R_2$ and $R_3$ represent hydrogen atoms, alkyl or alkoxy groups, Z represents the radical of an arylamide of an aromatic or heterocyclic ortho-hydroxy carboxylic acid or of an acylacetic acid, and $n$ stands for one of the integers 1 and 2.

More particularly, the invention relates to complex metal compounds selected from the group consisting of nickel, copper and cobalt compounds of water-insoluble azo-dyestuffs having a formula selected from the group consisting of

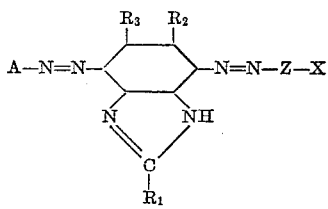

and

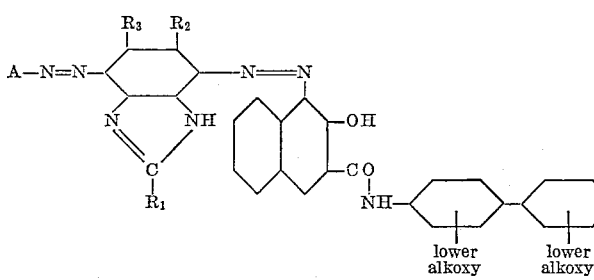
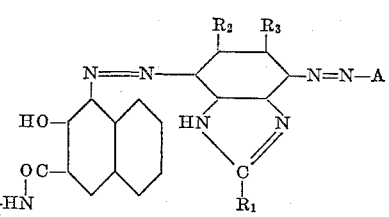

wherein A represents a member of the group consisting of phenyl, methylphenyl, methoxyphenyl, ethoxyphenyl, chlorophenyl, nitrophenyl, methylchlorophenyl, methoxychlorophenyl, methylnitrophenyl, methoxynitrophenyl, dichlorophenyl, methylsulfonylnitrophenyl, acetylphenyl, chlorophenoxy-chlorophenyl, benzoylamino-dimethoxyphenyl, naphthyl, quinolyl, indazolyl, methyl-benzimidazolyl, methylchloro-benzimidazolyl and phenylimino-dihydrotriazolyl, $R_1$ represents a member of the group consisting of hydrogen and methyl, $R_2$ and $R_3$ represent members of the group consisting of hydrogen, methyl, ethyl, methoxy and ethoxy, Z represents a member of the group consisting of 2.3-hydroxynaphthoylamino, 6-bromo-2.3-hydroxynaphtholyamino, 2-hydroxyanthracene - 3 - carbonylamino, 3 - hydroxydiphenylene oxide-2-carbonylamino, 2-hydroxycarbazole-3-carbonylamino and 5 - hydroxy - 1.2,1'.2'-benzocarbazole-4-carbonylamino, and X represents a member of the group consisting of phenyl, methylphenyl, methoxyphenyl, ethoxyphenyl, chlorophenyl, nitrophenyl, dimethylphenyl, dimethoxyphenyl, methylmethoxyphenyl, methylchlorophenyl, methoxychlorophenyl, dimethoxychlorophenyl, naphthyl and methoxydiphenylene oxide radical.

Water-insoluble azo-dyestuffs produced by coupling on the fiber yielding black dyeings are much appreciated in the dyeing industry, since they generally permit to produce very intense dyeings possessing good general properties of fastness. Vat dyestuffs, sulfur dyestuffs and substantive dyestuffs do not yield black dyeings having a high depth of color.

Among the coupling components used in the ice color industry for the production of black dyeings on cellulose fibers the 2.3-hydroxynaphthoic acid arylamides have particular importance, since on account of their affinity they can be well fixed on the fiber and, due to the various degrees of this affinity, they are suitable for all common dyeing methods and apparatuses. Apart from the dyeings on the basis of 4.4'-diamino-diphenylamine which have a low intensity and possess a moderate fastness to light and a poor fastness to chlorine, the diazo components used in practice belong to the series of the aminoazo compounds which yield dyeings of a good fastness to washing and to chlorine and a medium fastness to light. There are especially used the diazonium salts of 4'-nitro-4-amino-2.5-dimethoxy-1.1'-azo-benzene, of 4'-(4'' - aminophenylamino) - 4-amino-2-ethoxy-5-methyl-1.1'-azobenzene, of 1-(2'-ethoxyphenyl-1'-azo)-4-aminonaphthalene and other products. All these compounds yield intense dyeings which, however, do not exceed a medium fastness to light and which tend to bleeding in the peroxide bleach test and in boiling-off with caustic soda or sodium carbonate solution. They are, therefore, unsuitable for this treatment.

The deep black dyeings produced from para-nitroaniline, meta-nitrotoluidine and meta-nitro-ortho-anisidine and the highly substantive ortho-hydroxycarboxylic acid arylamides of benzo-carbazole possess a very good fastness to light. In practice, however, it is generally impossible to attain a complete coupling of the coupling component on the fiber so that by treating the material in boiling alkaline solutions and bleaching it with peroxide, white material is stained in undesired yellowish to reddish brown tints.

In spite of a good selection of available components it has hitherto not been possible to produce, under economically acceptable conditions, intense black dyeings which satisfy the high requirements as to fastness to light and show a good resistance in the peroxide bleach test.

We have found that new metalliferous water-insoluble azo-dyestuffs are obtained by coupling in substance, on the fiber or on another substratum a diazonium compound of an amine having the general formula

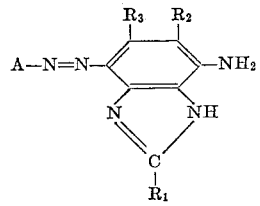

in which A represents an aromatic or heterocyclic radical, $R_1$ represents a hydrogen atom or an alkyl group and $R_2$ and $R_3$ represent hydrogen atoms, alkyl or alkoxy groups, with an arylamide of an aromatic or heterocyclic ortho-hydroxy carboxylic acid or of an acylacetic acid, the components being selected so that they are free from groups imparting solubility in water such, for example, as sulfonic acid or carboxylic acid groups, and treating the dyestuff so obtained with an agent yielding metal.

The treatment of the water-insoluble azo-dyestuffs obtainable by the present invention with the agents yielding metal may be carried out by known methods during or after the coupling in substance or on the fiber. When the dyestuffs are produced on the fiber, the metallization may be conducted by adding the compound yielding metal to the developing bath or already to the impregnation bath. The treatment of the dyestuffs with the agents yielding metal after the coupling may be carried out in a second bath which is neutral, weakly alkaline or weakly acid. The bath may contain dispersing agents or detergents, for example, a fatty alcohol polyglycol ether, an alkyl phenol polyglycol ether, an alkylnaphthol polyglycol ether, a fatty acid polyglycol ester or a fatty acid amide polyglycol ether.

As agents yielding metal there are preferably used for the process of the present invention compounds yielding copper, cobalt, nickel, iron and zinc which may be inorganic or organic salts of these metals such, for example, as chlorides, bromides, sulfates, nitrates, formates or acetates, or complex compounds of these metals, especially with hydroxy-alkylamines such, for example, as diethanolamine, triethanolamine or N-methyl-ethanolamine, or with amino-carboxylic acids such, for example, as aminoacetic acid or nitrilotriacetic acid, or with aliphatic hydroxy-carboxylic acids such, for example, as tartaric acid, citric acid or gluconic acid, or with alkali metal phosphates such, for example, as alkali metal polyphosphates or alkali metal pyrophosphates. When an agent yielding cobalt is used, the addition of an oxidizing agent such, for example, as an alkali metal perborate, an alkali metal percarbonate or a compound of hexavalent chromium has a favorable effect on the metallization.

By dyeing or printing according to the ice color method there are produced on vegetable fibers, including fibers of regenerated cellulose mainly black dyeings which possess good general fastness properties and especially a very good fastness to light.

The dyestuffs may be produced on vegetable fibers at a long goods-to-liquor ratio. Piece goods, warps and ribbons may be dyed in a continuous manner or printed by the base or naphtholate printing processes.

The novel dyestuffs can also be produced on animal fibers, such as wool or silk by the dyeing methods commonly applied to these fibers.

The dyestuffs can also be prepared in substance and converted into the complex metal compounds by treating them with an agent yielding metal. The complex metal compounds so obtained are suitable for dyeing synthetic fibers and also for coloring organic plastic masses of high molecular weight.

As coupling components there are used in the process of the present invention the arylamides of aromatic or heterocyclic ortho-hydroxycarboxylic acids or of acylacetic acids such, for example, as the arylamides of 2.3-hydroxynaphthoic acid or the derivatives thereof substituted in 6-position, or arylamides of 2-hydroxyanthracene-3-carboxylic acid, 3-hydroxy-diphenylene oxide-2-carboxylic acid, 2-hydroxycarbazole-3-carboxylic acid, 5-hydroxy-1.2.1'.2'-benzocarbazole-4-carboxylic acid, acetylacetic acid, benzoylacetic acid or terephthaloyl-bis-acetic acid. The arylamide radical may belong to the benzene, naphthalene, diphenyl or diphenylene oxide series.

As amino compounds which correspond to the aforesaid general formula and may advantageously be used in the process of the present invention, there are mentioned compounds in which the aromatic or heterocyclic radical A may be substituted by groups which do not impart solubility in water, for example halogen atoms, alkyl, alkoxy, aryloxy, trifluoromethyl, nitro, alkylsulfone, arylsulfone, acyl, acylamino, sulfonic acid amide or carboxylic acid amide groups which may contain substituents, furthermore cyano, arylazo or dialkylamino groups. The preparation of these compounds may be conducted, for example, by coupling the diazonium compounds of aromatic or heterocyclic amines with 7-aminobenzimidazoles of the general formula

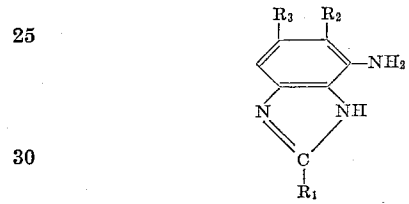

in which $R_1$, $R_2$ and $R_3$ have the meanings indicated above.

As aromatic amines there may be mentioned especially those of the benzene, naphthalene or anthracene series. As heterocyclic amines there may be used amino compounds in which the amino group is bound to an aryl radical connected to a heterocyclic radical or directly to a heterocyclic radical. Compounds of this kind are for example amino-carbazoles, amino-quinolines, amino-diphenylene oxides, amino-benztriazoles, amino-benzimidazoles, amino-benzthiazoles, amino-tetrazoles, amino-indazoles, amino-triazoles, amino-pyrazoles, amino-thiodiazoles or amino-thiazoles.

The following examples serve to illustrate the invention but they are not intended to limit it thereto, the parts being by weight unless otherwise stated and the relationship of parts by weight to parts by volume being the same as that of the kilogram to the liter.

EXAMPLE 1

Cotton yarn was treated for 45 minutes at 35° C., at a goods-to-liquor ratio of 1:20, in an impregnation bath, prepared as described below, centrifuged and then developed, first for 10 minutes at 20° C. and then, after being slowly heated to 90° to 95° C., for 20 to 30 minutes at 90° to 95° C. in a developing bath prepared as described below. Subsequently, the yarn was rinsed and soaped first for 15 minutes at 60° C., then for 15 minutes at 95° C. with a solution containing per liter of water 1 gram of a reaction product from about 10 mols of ethylene oxide and 1 mol of nonylphenol and 3 grams of sodium carbonate, rinsed again and dried.

*Impregnation Bath*

4.5 grams of 1-(2'.3'-hydroxynaphthoylamino)-2.4-dimethoxy-5-chlorobenzene were dissolved in 13.5 cc. of denatured ethyl alcohol, 1.5 cc. of sodium hydroxide solution of 38° Bé., 4.5 cc. of hot water and 1.5 cc. of formaldehyde solution of 33% strength. The solution so obtained was made up to 1 liter with water at 35° C. containing 3 grams of a condensation product from fatty acids of high molecular weight and protein degradation products and 10 cc. of sodium hydroxide solution of 30° Bé.

Developing Bath 2.7 grams of 7-amino-5-methyl-4-(3'-methylphenyl-1'-azo)-benzimidazole were diazotized with 6 cc. of hydrochloric acid of 20° Bé. and 4 cc. of sodium nitrite solution 1:5 and the diazo solution so obtained was introduced into a bath containing per liter of water 2 grams of a reaction product from about 20 mols of ethylene oxide and 1 mol of octadecyl alcohol, 20 grams of sodium acetate and 2.8 grams of nickel sulfate.

A black dyeing having a good fastness to light and to wet processing was obtained.

EXAMPLE 2

Cotton yarn was treated for 45 minutes at 35° C., at a goods-to-liquor ratio of 1:20 in an impregnation bath prepared as described below, centrifuged and developed for 30 minutes at 20° C. in the developing bath prepared as described below. The yarn was then rinsed and metallization was conducted in the following manner:

2.8 grams of nickel sulfate dissolved in 28 cc. of water were mixed with 30 cc. of a solution of aminoacetic acid in water (1:10) and made up to 1 liter with a solution containing 1 gram of a reaction product from about 10 mols of ethylene oxide and 1 mol of nonylphenol, 3 grams of sodium carbonate and water. The dyed material was after-treated in this solution at a goods-to-liquor ratio of 1:20, by heating from 60° to 95° C. and by treating the material for 30 minutes at 95° C. The yarn was then soaped for 15 minutes at 95° C. with a solution containing per liter of water 1 gram of a reaction product from about 10 mols of ethylene oxide and 1 mol of nonylphenol, and 3 grams of sodium carbonate, rinsed and dried.

Impregnation Bath 1.75 grams of 2-(2'.3'-hydroxynaphthoylamino)-naphthalene were dissolved in 3.5 cc. of denatured ethyl alcohol, 0.9 cc. of sodium hydroxide solution of 38° Bé., 1.8 cc. of hot water and 0.9 cc. of formaldehyde solution of 33% strength. The solution so obtained was made up to 1 liter with water at 35° C. containing 3 grams of a condensation product from fatty acids of high molecular weight and protein degradation products and 10 cc. of sodium hydroxide solution of 38° Bé.

Developing Bath 3.3 grams of 7-amino-5-methyl-4-(2'-methoxy-5'-nitrophenyl-1'-azo)-benzimidazole were diazotized with 6 cc. of hydrochloric acid of 20° Bé., 18 cc. of acetic acid and 4 cc. of sodium nitrite solution 1:5 and the diazo solution so obtained was introduced into a bath containing per 1 liter of water 2 grams of a reaction product from about 20 mols of ethylene oxide and 1 mol of octadecyl alcohol and 20 grams of sodium acetate.

A black dyeing having a good fastness to light and to wet processing was obtained.

EXAMPLE 3

42 parts of 7-amino-5-methyl-4-(2'-methoxyphenyl-1'-azo)-benzimidazole were pasted up with 120 parts by volume of acetic acid. After the addition of 45 parts by volume of concentrated hydrochloric acid the mixture was cooled to 0° C. and diazotized by adding 10.5 parts of sodium nitrite in the form of a concentrated aqueous solution and then rapidly heating to 35° to 40° C. The mixture was diluted with water to obtain about 1000 parts by volume. The diazo solution so obtained was added dropwise, while stirring well, to a solution of 2.3-hydroxynaphthoylaminobenzene prepared as follows: 30.5 parts of 2.3-hydroxynaphthoylaminobenzene were dissolved in 60 parts by volume of alcohol and 75 parts by volume of 5 N-sodium hydroxide solution, and a solution containing in 3000 parts by volume of water 200 parts of sodium carbonate was added. When the coupling was complete, a solution of 19 parts of copper sulfate and 90 parts by volume of triethanolamine in 300 parts by volume of water was introduced. Subsequently, the mixture was heated to 95° C. and treated for two hours at this temperature. The complex copper compound of the dyestuff so obtained was filtered off, washed and dried. It was a dark powder.

In the following table further components are listed which can be used in the process of the invention, and also the tints produced by forming the metalliferous azo-dyestuffs from these components on the fiber, which likewise possess good properties of fastness.

| Diazo component | Coupling component | Tint | | |
|---|---|---|---|---|
| | | Copper complex | Cobalt complex | Nickel complex |
| 7-amino-5-methyl-4-(2'-methoxyphenyl-1'-azo)-benzimidazole. | 2.3-hydroxynaphthoyl-aminobenzene | black | black | black. |
| Do | 1-(2'.3'-hydroxynaphthoylamino)-3-nitrobenzene. | do | do | Do. |
| Do | 4.4'-bis-(2''.3''-hydroxynaphthoylamino)-3.3'-dimethoxydiphenyl. | brown black | black brown | black brown. |
| Do | 1-(3'-hydroxydiphenylene-oxide-2'-carbonylamino)-2.5-dimethoxy-benzene. | grey | grey | grey. |
| Do | 1-(2'-hydroxycarbazole-3'-carbonylamino)-4-chlorobenzene. | black | black | black. |
| Do | 1-(2'-hydroxyanthracene-3'-carbonylamino)-2-methylbenzene. | black olive | greenish grey | black olive. |
| Do | 1-(5'-hydroxy-1'.2'-1''.2''-benzocarbazole-4'-carbonylamino)-4-methoxybenzene. | black | black | black. |
| Do | 1-(5'-hydroxy-1'.2'-1''.2''-benzocarbazole-4'-carbonylamino)-2-methyl-4-methoxybenzene. | do | do | Do. |
| Do | 4.4'-bis-acetoacetylamino-3.3'-dimethyldiphenyl. | dull violet | dark brown | dark brown. |
| Do | terephthaloyl-bis-(1-acetylamino-2.4-dimethoxy-5-chlorobenzene). | blue black | brownish black. | black brown. |
| Do | 1-(3'-hydroxydiphenylene oxide-2'-carbonyl amino)-naphthalene. | blue grey | grey | brownish grey. |
| Do | 1-(3'-hydroxydiphenylene oxide-2'-carbonyl-amino)-2-ethoxybenzene. | grey | do | Do. |
| Do | terephthaloyl-bis-(1-acetylamino-2-methoxy-4-chloro-5-methylbenzene). | reddish black | black brown | black brown. |
| Do | 2-acetoacetylamino-6-ethoxybenzthiazole | grey blue | greenish blue | blue. |
| Do | 1-acetoacetylamino-2.5-dimethoxy-4-chlorobenzene. | currant | reddish blue | reddish blue. |
| Do | 1-acetoacetylamino-2.5-dimethylbenzene | do | do | Do. |
| 7-amino-5-methyl-4-(2'-methyl-5'-chlorophenyl-1'-azo)-benzimidazole. | 2.3-hydroxynaphthoylaminobenzene | black | black | black. |
| Do | 2-(2'.3'-hydroxynaphthoylamino)-naphthalene | do | do | Do. |
| Do | 1-(2'.3'-hydroxynaphthoylamino)-2.5-dimethoxy-4-chlorobenzene. | do | do | Do. |

| Diazo component | Coupling component | Tint | | |
|---|---|---|---|---|
| | | Copper complex | Cobalt complex | Nickel complex |
| 7-amino-5-methyl-4-(2'-methoxy-5'-nitrophenyl-1'-azo)-benzimidazole. | 2.3-hydroxynaphthoylaminobenzene | black | black | black. |
| Do | 1-(2'.3'-hydroxynaphthoylamino)-naphthalene | do | do | Do. |
| Do | 1-(2'.3'-hydroxynaphthoylamino)-4-methoxybenzene | do | do | Do. |
| Do | 1-(2'.3'-hydroxynaphthoylamino)-2-methoxy-4-chloro-5-methylbenzene | do | do | Do. |
| Do | 1-(2'.3'-hydroxynaphthoylamino)-4-chlorobenzene | do | do | Do. |
| Do | 1-(2'.3'-hydroxynaphthoylamino)-2-methyl-4-chlorobenzene | do | do | Do. |
| Do | 1-(2'.3'-hydroxynaphthoylamino)-2-methyl-4-methoxybenzene | do | do | Do. |
| Do | 1-(2'.3'-hydroxynaphthoylamino)-2.4-dimethoxy-5-chlorobenzene | do | do | Do. |
| Do | 1-(2'.3'-hydroxynaphthoylamino)-3-nitrobenzene | do | do | Do. |
| Do | 1-(2'.3'-hydroxynaphthoylamino)-2-methylbenzene | do | do | Do. |
| Do | 1-(2'.3'-hydroxynaphthoylamino)-2.5-dimethoxybenzene | do | do | Do. |
| Do | 1-(2'.3'-hydroxynaphthoylamino)-4-ethoxybenzene | do | do | Do. |
| 7-amino-2.5-dimethyl-4-(2'-methoxyphenyl-1'-azo)-benzimidazole. | 2.3-hydroxynaphthoylaminobenzene | do | do | Do. |
| Do | 1-(2'.3'-hydroxynaphthoylamino)-2.5-dimethoxy-4-chlorobenzene | do | do | Do. |
| Do | 1-(2'.3'-hydroxynaphthoylamino)-4-chlorobenzene | do | do | Do. |
| Do | 1-(2'.3'-hydroxynaphthoylamino)-2-methoxybenzene | do | do | Do. |
| 7-amino-5-methyl-4-(3'-methylphenyl-1'-azo)-benzimidazole. | 1-(2'.3'-hydroxynaphthoylamino)-2-methoxy-4-chloro-5-methylbenzene | do | do | Do. |
| Do | 1-(2'.3'-hydroxynaphthoylamino)-4-chlorobenzene | do | do | Do. |
| Do | 1-(2'.3'-hydroxynaphthoylamino)-2-methyl-4-methoxybenzene | do | do | Do. |
| Do | 1-(2'.3'-hydroxynaphthoylamino)-2.4-dimethoxy-5-chlorobenzene | do | do | Do. |
| Do | 1-(2'.3'-hydroxynaphthoylamino)-2-ethoxybenzene | do | do | Do. |
| Do | 2-(2'.3'-hydroxynaphthoylamino)-3-methoxydiphenylene oxide | do | do | Do. |
| Do | 1-(6'-bromo-2'.3'-hydroxynaphthoylamino)-2-methoxybenzene | do | do | Do. |
| Do | 1-(2'.3'-hydroxynaphthoylamino)-4-methylbenzene | do | do | Do. |
| Do | 1-(2'.3'-hydroxynaphthoylamino)-4-ethoxybenzene | do | do | Do. |
| Do | 1-(2'.3'-hydroxynaphthoylamino)-2.4-dimethylbenzene | do | do | Do. |
| Do | 1-(2'.3'-hydroxynaphthoylamino)-2.3-dimethylbenzene | do | do | Do. |
| 7-amino-2.5-dimethyl-4-(2'-methoxy-5'-chlorophenyl-1'-azo)-benzimidazole. | 2.3-hydroxynaphthoylaminobenzene | do | do | Do. |
| Do | 2-(2'.3'-hydroxynaphthoylamino)-naphthalene | do | do | Do. |
| Do | 1-(2'.3'-hydroxynaphthoylamino)-2-methoxybenzene | do | do | Do. |
| Do | 1-(2'.3'-hydroxynaphthoylamino)-2.4-dimethoxy-5-chlorobenzene | do | do | Do. |
| Do | 1-(2'.3'-hydroxynaphthoylamino)-2-methoxy-5-chlorobenzene | do | do | Do. |
| 7-amino-5-methyl-4-(2'-methoxy-5'-chlorophenyl-1'-azo)-benzimidazole. | 1-(2'.3'-hydroxynaphthoylamino)-3-nitrobenzene | do | do | Do. |
| Do | 1-(2'.3'-hydroxynaphthoylamino)-4-methoxybenzene | do | do | Do. |
| Do | 1-(2'.3'-hydroxynaphthoylamino)-2-methyl-4-chlorobenzene | do | do | Do. |
| Do | 1-(2'.3'-hydroxynaphthoylamino)-2.4-dimethoxy-5-chlorobenzene | do | do | Do. |
| 7-amino-5-methyl-4-(3'-nitrophenyl-1'-azo)-benzimidazole. | 1-(2'.3'-hydroxynaphthoylamino)-4-methoxybenzene | do | do | Do. |
| Do | 1-(2'.3'-hydroxynaphthoylamino)-2-methylbenzene | do | do | Do. |
| 7-amino-5-methyl-4-(1'-phenyl-5'-imino-4'.5'-dihydro-1.2.4-triazolyl-3'-azo)-benzimidazole. | 2-(2'.3'-hydroxynaphthoylaminonaphthalene | do | do | Do. |
| 7-amino-5-methyl-4-phenylazo-benzimidazole | 1-(2'.3'-hydroxynaphthoylamino)-4-chlorobenzene | do | do | Do. |
| 7-amino-5-methyl-4-(4'-methoxyphenyl-1'-azo)-benzimidazole. | 1-(2'.3'-hydroxynaphthoylamino)-2-methoxybenzene | do | do | Do. |
| 7-amino-5-methyl-4-(3'-chlorophenyl-1'-azo)-benzimidazole. | 2-(2'.3'-hydroxynaphthoylamino)-3-methoxydiphenylene oxide | do | do | Do. |
| 7-amino-5-methyl-4-(4'-chlorophenyl-1'-azo)-benzimidazole. | 1-(2'.3'-hydroxynaphthoylamino)-2-methyl-4-chlorobenzene | do | do | Do. |
| 7-amino-5-methyl-4-(2'.5'-dichlorophenyl-1'-azo)-benzimidazole. | 1-(2'.3'-hydroxynaphthoylamino)-3-nitrobenzene | do | do | Do. |
| 7-amino-5-methyl-4-(2'-methyl-4'-chlorophenyl-1'-azo)-benzimidazole. | 2-(2'.3'-hydroxynaphthoylamino)-3-methoxydiphenylene oxide | do | do | Do. |
| 7-amino-5-methyl-4-(2'-methyl-5'-nitrophenyl-1'-azo)-benzimidazole. | 1-(2'.3'-hydroxynaphthoylamino)-2.4-dimethoxy-5-chlorobenzene | do | do | Do. |
| 7-amino-5-methyl-4-(2'-chlorophenyl-1'-azo)-benzimidazole. | 1-(2'.3'-hydroxynaphthoylamino)-2-ethoxybenzene | do | do | Do. |
| 7-amino-5-methyl-4-(naphthyl-1'-azo)-benzimidazole. | 1-(2'.3'-hydroxynaphthoylamino)-2-methyl-4-methoxybenzene | do | do | Do. |
| 7-amino-5-methyl-4-(quinolyl-8'-azo)-benzimidazole. | 2.3-hydroxynaphthoylaminobenzene | do | do | Do. |
| 7-amino-5-methyl-4-(2'-methyl-6'-chlorobenzimidazolyl-7'-azo)-benzimidazole. | 1-(2'.3'-hydroxynaphthoylamino)-2.4-dimethoxy-5-chlorobenzene | do | do | Do. |
| 7-amino-5-methyl-4-(2'-methoxy-4'-chlorophenyl-1'-azo)-benzimidazole. | 2-(2'.3'-hydroxynaphthoylamino)-naphthalene | do | do | Do. |
| 7-amino-2.5-dimethyl-4-phenylazobenzimidazole | 1-(2'.3'-hydroxynaphthoylamino)-3-nitrobenzene | do | do | Do. |
| 7-amino-2.5-dimethyl-4-(2'-chlorophenyl-1'-azo)-benzimidazole. | 1-(2'.3'-hydroxynaphthoylamino)-2-methyl-4-chlorobenzene | do | do | Do. |

| Diazo component | Coupling component | Tint | | |
|---|---|---|---|---|
| | | Copper complex | Cobalt complex | Nickel complex |
| 7-amino-2.5-dimethyl-4-(3'-nitrophenyl-1'-azo)-benzimidazole. | 2-(2'.3'-hydroxynaphthoylamino)-3-methoxy diphenylene oxide. | black | black | black. |
| 7-amino-5-methyl-4-(2'-methylphenyl-1'-azo)-benzimidazole. | 1-(2'.3'-hydroxynaphthoylamino)-3-nitrobenzene. | ----do---- | ----do---- | Do. |
| 7-amino-4-(2'-chloro-5'-methylphenyl-1'-azo)-benzimidazole. | 1-(2'.3'-hydroxynaphthoylamino)-4-chlorobenzene. | ----do---- | ----do---- | Do. |
| 7-amino-5-methyl-4-(2'-nitro-4'-methylphenyl-1'-azo)-benzimidazole. | 2-(2'.3'-hydroxynaphthoylamino)-naphthalene. | ----do---- | ----do---- | Do. |
| 7-amino-5-methyl-4-(4'-ethoxyphenyl-1'-azo)-benzimidazole. | ----do---- | ----do---- | ----do---- | Do. |
| 7-amino-2.5-dimethyl-4-(3'-nitrophenyl-1'-azo)-benzimidazole. | 2-(2'.3'-hydroxynaphthoylamino)-3-methoxydiphenylene oxide. | ----do---- | ----do---- | Do. |
| 7-amino-2.5-dimethyl-4-(2'-methoxy-4'-chlorophenyl-1'-azo)-benzimidazole. | 1-(2'.3'-hydroxynaphthoylamino)-2-methoxy-5-chlorobenzene. | ----do---- | ----do---- | Do. |
| 7-amino-2.5-dimethyl-4-(4'-chlorophenyl-1'-azo)-benzimidazole. | 1-(2'.3'-hydroxynaphthoylamino)-4-chlorobenzene. | ----do---- | ----do---- | Do. |
| 7-amino-5-methyl-4-(2'.5'-dimethoxy-4'-benzoylaminophenyl-1'-azo)-benzimidazole. | 2-(2'.3'-hydroxynaphsoylamino)-3-methoxydiphenylene oxide. | ----do---- | ----do---- | Do. |
| 7-amino-2.5-dimethyl-4-(3'-chlorophenyl-1'-azo)-benzimidazole. | 1-(2'.3'-hydroxynaphthoylamino)-2.4-dimethoxy-5-chlorobenzene. | ----do---- | ----do---- | Do. |
| 7-amino-2.5-dimethyl-4-(4'-methoxyphenyl-1'-azo)-benzimidazole. | 1-(2'.3'-hydroxynaphthoylamino)-3-nitrobenzene. | ----do---- | ----do---- | Do. |
| 7-amino-2.5-dimethyl-4-(4'-acetylphenyl-1'-azo)-benzimidazole. | 1-(2'.3'-hydroxynaphthoylamino)-2.5-dimethoxy-4-chlorobenzene. | ----do---- | ----do---- | Do. |
| 7-amino-2.5-dimethyl-4-(naphthyl-2'-azo)-benzimidazole. | 1-(2'.3'-hydroxynaphthoylamino)-3-nitrobenzene. | ----do---- | ----do---- | Do. |
| 7-amino-2.5-dimethyl-4-[2'-(4''-chlorophenoxy)-5'-chlorophenyl-1'-azo]-benzimidazole. | 1-(2'.3'-hydroxynaphthoylamino)-2-methyl-4-chlorobenzene. | ----do---- | ----do---- | Do. |
| 7-amino-2.5-dimethyl-4-(2'-methylsulfonyl-4'-nitrophenyl-1'-azo)-benzimidazole. | 1-(2'.3'-hydroxynaphthoylamino)-2.4-dimethoxy-5-chlorobenzene. | ----do---- | ----do---- | Do. |
| 7-amino-2.6-dimethyl-4-phenylazo-benzimidazole. | 2.3-hydroxynaphthoylaminobenzene. | ----do---- | reddish dark blue. | greenish blue black. |
| Do. | 2-(2'.3'-hydroxynaphthoylamino)-naphthalene. | ----do---- | ----do---- | greenish black blue. |
| Do. | 1-(2'.3'-hydroxynaphthoylamino)-2.4-dimethoxy-5-chlorobenzene. | ----do---- | ----do---- | Do. |
| 7-amino-2.6-dimethyl-4-(2'-chlorophenyl-1'-azo)-benzimidazole. | 2.3-hydroxynaphthoylaminobenzene. | ----do---- | ----do---- | Do. |
| Do. | 2-(2'.3'-hydroxynaphthoylamino)-naphthalene. | ----do---- | ----do---- | Do. |
| Do. | 1-(2'.3'-hydroxynaphthoylamino)-2.4-dimethoxy-5-chlorobenzene. | ----do---- | black blue | Do. |
| 7-amino-2.6-dimethyl-4-(3'-chlorophenyl-1'-azo)-benzimidazole. | 2.3-hydroxynaphthoylaminobenzene. | ----do---- | ----do---- | Do. |
| Do. | 1-(2'.3'-hydroxynaphthoylamino)-2.4-dimethoxy-5-chlorobenzene. | ----do---- | ----do---- | Do. |
| Do. | 2-(2'.3'-hydroxynaphthoylamino)-naphthalene. | ----do---- | ----do---- | Do. |

| Diazo component | Coupling component | Tint | | | | |
|---|---|---|---|---|---|---|
| | | Copper complex | Cobalt complex | Nickel complex | Iron complex | Zinc complex |
| 7-amino-5-methyl-4-(2'-methoxy-phenyl-1'-azo)-benzimidazole. | (2'.3'-hydroxy-naphthoyl-amino)-naphthalene. | black | black | black | black | black |
| Do. | 1-(2'.3'-hydroxy-naphthoyl-amino)-2.4.dimethoxy-5-chlorobenzene. | ---do--- | ---do--- | ---do--- | ---do--- | Do. |

| Diazo component | Coupling component | Tint | | |
|---|---|---|---|---|
| | | Copper complex | Cobalt complex | Nickel complex |
| 7-amino-5-methyl-4-(1'-phenyl-5'-imino-4'.5'-dihydro-1.2.4-triazolyl-3'-azo)-benzimidazole. | 1-(2'.3'-hydroxynapthoylamino)-3-nitrobenzene. | black | black | black. |
| Do. | 1-(2'.3'-hydroxynaphthoylamino)-4-chlorobenzene. | ----do---- | ----do---- | Do. |
| Do. | 1-(2'.3'-hydroxynaphthoylamino)-2-methyl-5-chlorobenzene. | ----do---- | ----do---- | Do. |
| Do. | 1-(2'.3'-hydroxynaphthoylamino)-4-ethoxybenzene. | ----do---- | ----do---- | Do. |
| 7-amino-5-methyl-4-phenylazo-benzimidazole. | 2-(2'.3'-hydroxynaphthoylamino)-naphthalene. | ----do---- | ----do---- | Do. |
| Do. | 2.3-hydroxynaphthoylaminobenzene. | ----do---- | ----do---- | Do. |
| Do. | 1-(2'.3'-hydroxynaphthoylamino)-2.4-dimethoxy-5-chlorobenzene. | ----do---- | ----do---- | Do. |
| Do. | 1-(2'.3'-hydroxynaphthoylamino)-4-methoxybenzene. | ----do---- | ----do---- | Do. |
| Do. | 1-(2'.3'-hydroxynaphthoylamino)-4-chlorobenzene. | ----do---- | ----do---- | Do. |
| 7-amino-5-methyl-4-(3'-nitrophenyl-1'-azo)-benzimidazole. | 1-(2'.3'-hydroxynaphthoylamino)-3-nitrobenzene. | ----do---- | ----do---- | Do. |
| Do. | 1-(2'.3'-hydroxynaphthoylamino)-2-methyl-4-methoxybenzene. | ----do---- | ----do---- | Do. |
| Do. | 1-(2'.3'-hydroxynaphthoylamino)-2.5-dimethoxy-4-chlorobenzene. | ----do---- | ----do---- | Do. |
| 7-amino-5-methyl-4-(4'-methoxyphenyl-1'-azo)-benzimidazole. | 2.3-hydroxynaphthoylaminobenzene. | ----do---- | ----do---- | Do. |
| Do. | 1-(2'.3'-hydroxynaphthoylamino)-naphthalene. | ----do---- | ----do---- | Do. |
| Do. | 1-(2'.3'-hydroxynaphthoylamino)-2-methoxy-4-chloro-5-methylbenzene. | ----do---- | ----do---- | Do. |
| Do. | 1-(2'.3'-hydroxynaphthoylamino)-2.5-dimethoxybenzene. | ----do---- | ----do---- | Do. |
| 7-amino-5-methyl-4-(3'-chlorophenyl-1'-azo)-benzimidazole. | 1-(2'.3'-hydroxynaphthoylamino)-4-chlorobenzene. | ----do---- | ----do---- | Do. |
| Do. | 1-(2'.3'-hydroxynaphthoylamino)-4-methoxybenzene. | ----do---- | ----do---- | Do. |
| Do. | 1-(2'.3'-hydroxynaphthoylamino)-naphthalene. | ----do---- | ----do---- | Do. |
| Do. | 1-(2'.3'-hydroxynaphthoylamino)-4-ethoxybenzene. | ----do---- | ----do---- | Do. |

| Diazo component | Coupling component | Tint | | |
|---|---|---|---|---|
| | | Copper complex | Cobalt complex | Nickel complex |
| 7-amino-5-methyl-4-(4'-chlorophenyl-1'-azo)-benzimidazole. | 2.3-hydroxynaphthoylaminobenzene | black | black | black. |
| Do | 2-(2'.3'-hydroxynaphthoylamino)-naphthalene | do | do | Do. |
| Do | 1-(2'.3'-hydroxynaphthoylamino)-4-methoxybenzene | do | do | Do. |
| Do | 1-(2'.3'-hydroxynaphthoylamino)-2-methoxy-5-chlorobenzene | do | do | Do. |
| 7-amino-5-methyl-4-(2'.5'-dichlorophenyl-1'-azo)-benzimidazole. | 1-(2'.3'-hydroxynaphthoylamino)-naphthalene | do | do | Do. |
| Do | 1-(2'.3'-hydroxynaphthoylamino)-2-methylbenzene | do | do | Do. |
| Do | 1-(2'.3'-hydroxynaphthoylamino)-4-chlorobenzene | do | do | Do. |
| Do | 1-(2'.3'-hydroxynaphthoylamino)-2-methyl-5-chlorobenzene | do | do | Do. |
| 7-amino-5-methyl-4-(2'-methyl-4'-chlorophenyl-1'-azo)-benzimidazole. | 2.3-hydroxynaphthoylaminobenzene | do | do | Do. |
| Do | 1-(2'.3'-hydroxynaphthoylamino)-2.5-dimethoxy-4-chlorobenzene | do | do | Do. |
| Do | 1-(2'.3'-hydroxynaphthoylamino)-2.4-dimethoxy-5-chlorobenzene | do | do | Do. |
| Do | 1-(2'.3'-hydroxynaphthoylamino)-2.4-dimethoxybenzene | do | do | Do. |
| 7-amino-5-methyl-4-(2'-methyl-5'-nitrophenyl-1'-azo)-benzimidazole. | 1-(2'.3'-hydroxynaphthoylamino)-3-nitrobenzene | do | do | Do. |
| Do | 2-(2'.3'-hydroxynaphthoylamino)-3-methoxydiphenylene oxide | do | do | Do. |
| Do | 1-(2'.3'-hydroxynaphthoylamino)-2.3-dimethylbenzene | do | do | Do. |
| Do | 1-(2'.3'-hydroxynaphthoylamino)-4-chlorobenzene | do | do | Do. |
| 7-amino-5-methyl-4-(2'-chlorophenyl-1'-azo)-benzimidazole. | 1-(2'.3'-hydroxynaphthoylamino)-4-methoxybenzene | | | |
| Do | 1-(2'.3'-hydroxynaphthoylamino)-2-methyl-4-chlorobenzene | do | do | Do. |
| Do | 1-(2'.3'-hydroxynaphthoylamino)-2.5-dimethoxybenzene | do | do | Do. |
| 7-amino-5-methyl-4-(2'-chlorophenyl-1'-azo)-benzimidazole. | 1-(2'.3'-hydroxynaphthoylamino)-2.5-dimethoxy-4-chlorobenzene | do | do | Do. |
| 7-amino-5-methyl-4-quinolyl-8'-azobenzimidazole | 1-(2'.3'-hydroxynaphthoylamino)-4-chlorobenzene | do | do | Do. |
| Do | 1-(2'.3'-hydroxynaphthoylamino)-3-nitrobenzene | do | do | Do. |
| Do | 1-(2'.3'-hydroxynaphthoylamino)-2.4-dimethoxy-5-chlorobenzene | do | do | Do. |
| 7-amino-5-methyl-4-(2'-methyl-6'-chloro-benzimidazolyl-7'-azo)-benzimidazole. | 2-(2'.3'-hydroxynaphthoylamino)-naphthalene | do | do | Do. |
| Do | 1-(2'.3'-hydroxynaphthoylamino)-4-chlorobenzene | do | do | Do. |
| Do | 1-(2'.3'-hydroxynaphthoylamino)-4-methoxybenzene | do | do | Do. |
| Do | 1-(2'.3'-hydroxynaphthoylamino)-2-methoxy-5-chlorobenzene | do | do | Do. |
| 7-amino-5-methyl-4-(2'-methoxy-5'-chlorophenyl-1'-azo)-benzimidazole. | 2-(2'.3'-hydroxynaphthoylamino)-naphthalene | do | do | Do. |
| Do | 1-(2'.3'-hydroxynaphthoylamino)-4-chlorobenzene | do | do | Do. |
| Do | 1-(2'.3'-hydroxynaphthoylamino)-2.4-dimethoxy-5-chlorobenzene | do | do | Do. |
| Do | 1-(2'.3'-hydroxynaphthoylamino)-2-methyl-4-chlorobenzene | do | do | Do. |
| 7-amino-2.5-dimethyl-4-phenylazobenzimidazole | 2.3-hydroxynaphthoylaminobenzene | do | do | Do. |
| 7-amino-5-methyl-4-quinolyl-8'-azobenzimidazole | 2-(2'.3'-hydroxynaphthoylamino)-naphthalene | do | do | Do. |
| 7-amino-2.5-dimethyl-4-phenylazo-benzimidazole | 1-(2'.3'-hydroxynaphthoylamino)-naphthalene | do | do | Do. |
| Do | 1-(2'.3'-hydroxynaphthoylamino)-2-methoxy-4-chloro-5-methylbenzene | do | do | Do. |
| Do | 1-(2'.3'-hydroxynaphthoylamino)-2.5-dimethoxybenzene | do | do | Do. |
| 7-amino-2.5-dimethyl-4-(2'-methoxyphenyl-1'-azo)-benzimidazole. | 2.3-hydroxynaphthoylaminobenzene | do | do | Do. |
| Do | 2-(2'.3'-hydroxynaphthoylamino)-naphthalene | do | do | Do. |
| Do | 1-(2'.3'-hydroxynaphthoylamino)-4-chlorobenzene | do | do | Do. |
| Do | 1-(2'.3'-hydroxynaphthoylamino)-4-ethoxybenzene | do | do | Do. |
| 7-amino-2.5-dimethyl-4-(2'-chlorophenyl-1'-azo)-benzimidazole. | 1-(2'.3'-hydroxynaphthoylamino)-2-methyl-4-methoxybenzene | do | do | Do. |
| Do | 2-(2'.3'-hydroxynaphthoylamino)-3-methoxydiphenylene oxide | do | do | Do. |
| Do | 1-(2'.3'-hydroxynaphthoylamino)-2-ethoxybenzene | do | do | Do. |
| Do | 1-(2'.3'-hydroxynaphthoylamino)-4-methoxybenzene | do | do | Do. |
| 7-amino-2.5-dimethyl-4-(3'-nitrophenyl-1'-azo)-benzimidazole. | 1-(2'.3'-hydroxynaphthoylamino)-naphthalene | do | do | Do. |
| Do | 1-(2'.3'-hydroxynaphthoylamino)-2-methyl-5-chlorobenzene | do | do | Do. |
| Do | 1-(2'.3'-hydroxynaphthoylamino)-2-methylbenzene | do | do | Do. |
| Do | 1-(2'.3'-hydroxynaphthoylamino)-2.5-dimethoxy-4-chlorobenzene | do | do | Do. |
| 7-amino-5-methyl-4-(2'-methylphenyl-1'-azo)-benzimidazole. | 1(2'.3'-hydroxynaphthoylamino)-2.5-dimethoxybenzene | do | do | Do. |
| Do | 1-(2'.3'-hydroxynaphthoylamino)-naphthalene | do | do | Do. |
| Do | 1-(2'.3'-hydroxynaphthoylamino)-2-methoxy-5-chlorobenzene | do | do | Do. |
| Do | 1-(2'.3'-hydroxynaphthoylamino)-4-methylbenzene | do | do | Do. |
| 7-amino-4-(2'-chloro-5'-methylphenyl-1'-azo)-benzimidazole. | 1-(2'.3'-hydroxynaphthoylamino)-2.4-dimethylbenzene | do | do | Do. |
| Do | 2.3-hydroxynaphthoylaminobenzene | do | do | Do. |
| Do | 2-(2'.3'-hydroxynaphthoylamino)-naphthalene | do | do | Do. |
| Do | 1-(2'.3'-hydroxynaphthoylamino)-4-chlorobenzene | do | do | Do. |

| Diazo component | Coupling component | Tint | | |
|---|---|---|---|---|
| | | Copper complex | Cobalt complex | Nickel complex |
| 7-amino-5-methyl-4-(2'-nitro-4'-methylphenyl-1'-azo)-benzimidazole. | 1-(2'.3'-hydroxynaphthoylamino)-naphthalene. | black | black | black. |
| Do | 1-(2'.3'-hydroxynaphthoylamino)-2-methyl-4-chlorobenzene. | do | do | Do. |
| Do | 1-(2'.3'-hydroxynaphthoylamino)-2.4-dimethoxy-5-chlorobenzene. | do | do | Do. |
| Do | 1-(2'.3'-hydroxynaphthoylamino)-2.5-dimethoxybenzene. | do | do | Do. |
| 7-amino-5-methyl-4-(4'-ethoxyphenyl-1'-azo)-benzimidazole. | 1-(2'.3'-hydroxynaphthoylamino)4-chlorobenzene. | do | do | Do. |
| Do | 1-(2'.3'-hydroxynaphthoylamino)-2.5-dimethoxy-4-chlorobenzene. | do | do | Do. |
| Do | 1-(2'.3'-hydroxynaphthoylamino)-2-ethoxybenzene. | do | do | Do. |
| Do | 1-(2'.3'-hydroxynaphthoylamino)-2-methoxy-5-chlorobenzene. | do | do | Do. |
| 7-amino-2.5-dimethyl-4-(3'-nitrophenyl-1'-azo)-benzimidazole. | 2.3-hydroxynaphthoylaminobenzene. | do | do | Do. |
| Do | 1-(2'.3'-hydroxynaphthoylamino)-4-methoxybenzene. | do | do | Do. |
| Do | 1-(2'.3'-hydroxynaphthoylamino)-2.4-dimethoxy-5-chlorobenzene. | do | do | Do. |
| Do | 2-(2'.3'-hydroxynaphthoylamino)-naphthalene. | do | do | Do. |
| 7-amino-2.5-dimethyl-4-(2'-methoxy-4'-chlorophenyl-1'-azo)-benzimidazole. | 1-(2'.3'-hydroxynaphthoylamino)-naphthalene. | do | do | Do. |
| Do | 1-(2'.3'-hydroxynaphthoylamino)-3-nitrobenzene. | do | do | Do. |
| Do | 1-(2'.3'-hydroxynaphthoylamino)-4-chlorobenzene. | do | do | Do. |
| Do | 1-(2'.3'-hydroxynaphthoylamino)-2.4-dimethoxy-5-chlorobenzene. | do | do | Do. |
| 7-amino-2.5-dimethyl-4-(4'-chlorophenyl-1'-azo)-benzimidazole. | 1-(2'.3'-hydroxynaphthoylamino)-2-methoxy-4-chloro-5-methylbenzene. | do | do | Do. |
| Do | 1-(2'.3'-hydroxynaphthoylamino)-2-methoxybenzene. | do | do | Do. |
| Do | 1-(2'.3'-hydroxynaphthoylamino)-2-methylbenzene. | do | do | Do. |
| Do | 1-(2'.3'-hydroxynaphthoylamino)-2-methyl-4-methoxybenzene. | do | do | Do. |
| 7-amino-5-methyl-4-(2'.5'-dimethoxy-4'-benzoylaminophenyl-1'-azo)-benzimidazole. | 2.3-hydroxynaphthoylaminobenzene. | do | do | Do. |
| Do | 1-(2'.3'-hydroxynaphthoylamino)-4-chlorobenzene. | do | do | Do. |
| Do | 2-(2'.3'-hydroxynaphthoylamino)-naphthalene. | do | do | Do. |
| Do | 1-(2'.3'-hydroxynaphthoylamino)-2.5-dimethoxy-4-chlorobenzene. | do | do | Do. |
| 7-amino-2.5-dimethyl-4-(3'-chlorophenyl-1'-azo)-benzimidazole. | 1-(2'.3'-hydroxynaphthoylamino)-4-methoxybenzene. | do | do | Do. |
| Do | 2-(2'.3'hydroxynaphthoylamino)-3-methoxy-diphenylene oxide. | do | do | Do. |
| Do | 1-(2'.3'-hydroxynaphthoylamino)-2-methyl-5-chlorobenzene. | do | do | Do. |
| Do | 1-(2'.3'-hydroxynaphthoylamino)-2.3-dimethylbenzene. | do | do | Do. |
| 7-amino-2.5-dimethyl-4-(4'-methoxyphenyl-1'-azo)-benzimidazole. | 1-(2'.3'-hydroxynaphthoylamino)-2-methylbenzene. | do | do | Do. |
| Do | 1-(2.3'-hydroxynaphthoylamino)-2-methoxybenzene. | do | do | Do. |
| Do | 1-(2'.3'-hydroxynaphthoylamino)-2-methyl-4-chlorobenzene. | do | do | Do. |
| Do | 1-(2'.3'-hydroxynaphthoylamino)-2-methoxy-5-chlorobenzene. | do | do | Do. |
| 7-amino-2.5-dimethyl-4-(4'-acetylphenyl-1'-azo)-benzimidazole. | 1-(2'.3'-hydroxynaphthoylamino)-3-nitrobenzene. | do | do | Do. |
| Do | 1-(2'.3'-hydroxynaphthoylamino)-naphthalene. | do | do | Do. |
| Do | 1-(2'.3'-hydroxynaphthoylamino)-4-methoxybenzene. | do | do | Do. |
| Do | 2-(2'.3'-hydroxynaphthoylamino)-naphthalene. | do | do | Do. |
| 7-amino-2.5-dimethyl-4-(naphthyl-2'-azo)-benzimidazole. | 1-(2'.3'-hydroxynaphthoylamino)-2-methyl-5-chlorobenzene. | do | do | Do. |
| Do | 1-(2'.3'-hydroxynaphthoylamino)-2.3-dimethylbenzene. | do | do | Do. |
| Do | 1-(2'.3'-hydroxynaphthoylamino)-2.5-dimethoxybenzene. | do | do | Do. |
| Do | 1-(2'.3'-hydroxynaphthoylamino)-4-chlorobenzene. | do | do | Do. |
| 7-amino-2.5-dimethyl-4-[2'-(4''-chlorophenoxy)-5'-chlorophenyl-1'-azo]-benzimidazole. | 2.3-hydroxynaphthoylaminobenzene. | do | do | Do. |
| Do | 1-(2'.3'-hydroxynaphthoylamino)-2-methyl-4-chlorobenzene. | do | do | Do. |
| Do | 2-(2'.3'-hydroxynaphthoylamino)-3-methoxy-diphenylene oxide. | do | do | Do. |
| Do | 1-(2'.3'-hydroxynaphthoylamino)-2-ethoxybenzene. | do | do | Do. |
| 7-amino-2.5-dimethyl-4-(2'-methylsulfonyl-4'-nitrophenyl-1'-azo)-benzimidazole. | 1-(2'.3'-hydroxynaphthoylamino)-2-methoxy-4-chloro-5-methylbenzene. | do | do | Do. |
| Do | 1-(2'.3'-hydroxynaphthoylamino)-2-methoxybenzene. | do | do | Do. |
| Do | 1-(2'.3'-hydroxynaphthoylamino)-4-ethoxybenzene. | do | do | Do. |
| Do | 1-(2'.3'-hydroxynaphthoylamino)-2-methyl-4-methoxybenzene. | do | do | Do. |
| 7-amino-2.6-dimethyl-4-(2'-chlorophenyl-1'-azo)-benzimidazole. | 1-(2'.3'-hydroxynaphthoylamino)-3-nitrobenzene. | do | do | Do. |
| Do | 1-(2'.3'-hydroxynaphthoylamino)-2-methyl-4-methoxybenzene. | do | do | Do. |
| Do | 2-(2'.3'-hydroxynaphthoylamino)-3-methoxy-diphenylene oxide. | do | do | Do. |
| 7-amino-5-methoxy-4-phenylazo-benzimidazole. | 1-(2'.3'-hydroxynaphthoylamino)-4-methoxybenzene. | do | do | Do. |
| Do | 1-(2'.3'-hydroxynaphthoylamino)-2.5-dimethoxybenzene. | do | do | Do. |
| Do | 1-(2'.3'-hydroxynaphthoylamino)-2.5-dimethoxy-4-chlorobenzene. | do | do | Do. |

| Diazo component | Coupling component | Tint | | |
|---|---|---|---|---|
| | | Copper complex | Cobalt complex | Nickel complex |
| Do | 1-(2',3'-hydroxynaphthoylamino)-2-methyl-5-chlorobenzene. | black | black | black. |
| Do | 1-(2',3'-hydroxynaphthoylamino)-2-methyl-4-chlorobenzene. | do | do | Do. |
| 7-amino-2.5-dimethyl-4-(3'-methylphenyl-1'-azo)-benzimidazole. | 1-(2',3'-hydroxynaphthoylamino)-naphthalene | do | do | Do. |
| Do | 1-(2',3'-hydroxynaphthoylamino)-4-methoxybenzene. | do | do | Do. |
| Do | 1-(2',3'-hydroxynaphthoylamino)-2-methyl-4-chlorobenzene. | do | do | Do. |
| Do | 1-(2',3'-hydroxynaphthoylamino)-2.4-dimethoxy-5-chlorobenzene. | do | do | Do. |
| Do | 2(2',3'-hydroxynaphthoylamino)-3-methoxy-diphenylene oxide. | do | do | Do. |
| 7-amino-2.6-dimethyl-4-(2'-methoxy-5'-nitrophenyl-1'-azo)-benzimidazole. | 1-(2',3'-hydroxynaphthoylamino)-3-nitrobenzene. | do | do | Do. |
| Do | 1-(2',3'-hydroxynaphthoylamino)-2-methylbenzene. | do | do | Do. |
| Do | 1-(2',3'-hydroxynaphthoylamino)-2.5-dimethoxy-4-chlorobenzene. | do | do | Do. |
| Do | 1-(2',3'-hydroxynaphthoylamino)-2.5-dimethoxybenzene. | do | do | Do. |
| 7-amino-2.6-dimethyl-4-(2'-methoxy-5'-chlorophenyl-1'-azo)-benzimidazole. | 2-(2',3'-hydroxynaphthoylamino)-naphthalene | blackish currant. | blackish currant. | blackish currant. |
| Do | 1-(2',3'-jydroxynaphthoylamino)-4-chlorobenzene. | do | do | Do. |
| Do | 1-(2',3'-hydroxynaphthoylamino)-2.4-dimethoxy-5-chlorobenzene. | do | do | Do. |
| Do | 1-(2',3'-hydroxynaphthoylamino)-2-methyl-4-chlorobenzene. | do | do | Do. |
| 7-amino-5-methyl-4-(2'-methoxy-5'-nitrophenyl-1'-azo)-benzimidazole. | 1-(5'-hydroxy-1'.2'.1''.2''-benzocarbazole-4'-carbonylamino)-4-methoxybenzene. | | | black. |
| Do | 1-(5'-hydroxy-1'.2'.1''.2''-benzocarbazole-4'-carbonylamino)-2-methyl-4-methoxybenzene. | | | Do. |
| Do | 4.4'-bis-(2''.3''-hydroxynaphthoylamino)-3.3'-dimethoxy-diphenyl. | | | brownish black. |
| Do | 1-(2'hydroxycarbazole-3'-carbonylamino)-4-chorobenzene. | | | Do. |
| Do | 1-(3'-hydroxydiphenylene oxide-2'-carbonylamino)-2.5-dimethoxybenzene. | | | borownish grey. |
| Do | 1-(3'-hydroxydiphenylene oxide-2'-carbonylamino)-naphthalene. | | | Do. |
| Do | 1-(3'-hydroxydiphenylene oxide-2'-carbonylamino)-2'-ethoxybenzene. | | | Do. |
| Do | 1-(2'-hydroxyanthracene-3'-carbonylamino)-2-methylbenzene. | | | greenish grey black. |
| 7-amino-5.6-dimethoxy-4-(2'-methoxy-5'-chlorophenyl-1'-azo)benzimidazole. | 2.3-hydroxynaphthoylaminobenzene | black | black | black. |
| Do | 1-(2',3'-hydroxynaphthoylamino)-4-chlorobenzene. | do | do | Do. |
| Do | 2-(2',3'-hydroxynaphthoylamino)-naphthalene | do | do | Do. |
| Do | 1-(2',3'-hydroxynaphthoylamino)-2-methyl-4-chlorobenzene. | do | do | Do. |
| Do | 1-(2',3'-hydroxynaphthoylamino)-2.4-dimethoxy-5-chlorobenzene. | do | do | Do. |
| 7-amino-5.6-dimethoxy-4-(2'-methoxy-5'-nitrophenyl-1'-azo)-benzimidazole. | 1-(2',3'-hydroxynaphthoylamino)-3-nitrobenzene | do | do | Do. |
| Do | 1-(2',3'-hydroxynaphthoylamino)-naphthalene | do | do | Do. |
| Do | 1-(2',3'-hydroxynaphthoylamino)-4-methoxybenzene. | do | do | Do. |
| Do | 1-(2',3'-hydroxynaphthoylamino)-2-methoxy-4-chloro-5-methylbenzene. | do | do | Do. |
| Do | 2-(2',3'-hydroxynaphthoylamino)-3-methoxy-diphenylene oxide. | do | do | Do. |
| 7-amino-5.6-dimethoxy-4-(2'-methoxyphenyl-1'-azo)-benzimidazole. | 1-(2',3'-hydroxynaphthoylamino)-2-methoxybenzene. | do | do | Do. |
| Do | 1-(2',3'-hydroxynaphthoylamino)-2-methylbenzene. | do | do | Do. |
| Do | 1-(2',3'-hydroxynaphthoylamino)-2.5-dimethoxy-4-chlorobenzene. | do | do | Do. |
| Do | 1-(2',3'-hydroxynaphthoylamino)-2.5-dimethoxybenzene. | do | do | Do. |
| Do | 1-(2',3'-hydroxynaphthoylamino)-4-ethoxybenzene. | do | do | Do. |
| 7-amino-2.6-dimethyl-4-(4'-chlorophenyl-1'-azo)-benzimidazole. | 2.3'-hydroxynaphthoylaminobenzene | do | dark blue | dark blue. |
| Do | 2-(2',3'-hydroxynaphthoylamino)-naphthalene | do | do | Do. |
| Do | 1-(2',3'-hydroxynaphthoylamino)-4-chlorobenzene. | do | do | Do. |
| Do | 1-(2',3'-hydroxynaphthoylamino)-2-methoxy-5-chlorobenzene. | do | do | Do. |
| Do | 1-(2',3'-hydroxynaphthoylamino)-4-ethoxybenzene. | do | do | Do. |
| 7-amino-5-methyl-4-(quinolyl-8'-azo)-benzimidazole. | 2.3-hydroxynaphthoylaminobenzene | do | black | black. |
| Do | 2-(2',3'-hydroxynaphthoylamino)-naphthalene | do | do | Do. |
| 7-amino-5-methyl-4-(5'-methyl-benzimidazolyl-7'-azo)-benzimidazole. | 2.3-hydroxynaphthoylaminobenzene | do | do | Do. |
| Do | 2-(2',3'-hydroxynaphthoylamino)naphthalene | do | do | Do. |
| 7-amino-5-methyl-4-(indazolyl-7'-azo)-benzimidazole. | 2.3-hydroxynaphthoylaminobenzene | do | do | Do. |
| Do | 2-(2',3'-hydroxynaphthoylamino)naphthalene | do | do | Do. |
| Do | 1-(2',3'-hydroxynaphthoylamino)-4-chlorobenzene. | do | do | Do. |
| Do | 1-(2',3'-hydroxynaphthoylamino)-2.4-dimethoxy-5-chlorobenzene. | do | do | Do. |
| 7-amino-5-ethyl-4-(2'-methoxy-5'-nitrophenyl-1'-azo)-benzimidazole. | 2.3-hydroxynaphthoylaminobenzene | do | do | Do. |
| Do | 2-(2',3'-hydroxynaphthoylamino)naphthalene | do | do | Do. |
| 7-amino-5.6-diethoxy-4-(2'-methoxy-4'-nitrophenyl-1'-azo)-benzimidazole. | 2.3-hydroxynaphthoylaminobenzene | do | do | Do. |
| Do | 2-(2',3'-hydroxynaphthoylamino)naphthalene | do | do | Do. |

| Diazo component | Coupling component | Tint | | |
|---|---|---|---|---|
| | | Copper complex | Cobalt complex | Nickel complex |
| 7-amino-2.6-dimethyl-4-phenylazobenzimidazole | 1-(2'.3'-hydroxynaphthoylamino)-4-chlorobenzene. | black | black | black. |
| Do | 1-(2'.3'-hydroxynaphthoylamino)-2.5-dimethoxy-4-chlorobenzene. | do | do | Do. |
| 7-amino-2.6-dimethyl-4-(3'-chlorophenyl-1'-azo)-benzimidazole. | 1-(2'.3'-hydroxynaphthoylamino)naphthalene | do | do | Do. |
| Do | 1-(2'.3'-hydroxynaphthoylamino)-2-methoxy-4-chloro-5-methylbenzene. | do | do | Do. |

We claim:
1. The complex metal compounds selected from the group consisting of nickel, copper and cobalt compounds of water-insoluble azo-dyestuffs having a formula selected from the group consisting of

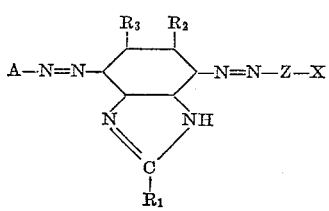

and

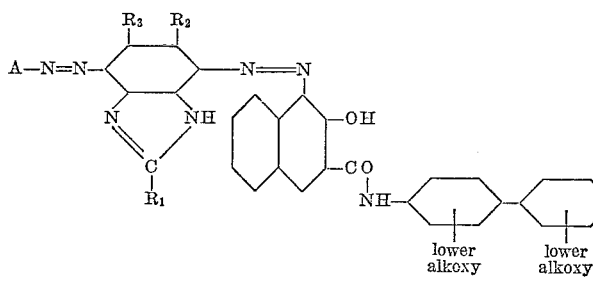

wherein A represents a member of the group consisting of phenyl, methylphenyl, methoxyphenyl, ethoxyphenyl, chlorophenyl, nitrophenyl, methylchlorophenyl, methoxychlorophenyl, methylnitrophenyl, methoxynitrophenyl, dichlorophenyl, methylsulfonylnitrophenyl, acetylphenyl, chlorophenoxy-chlorophenyl, benzoylamino-dimethoxyphenyl, naphthyl, quinolyl, indazolyl, methylbenzimidazolyl, methylchloro-benzimidazolyl and phenylimino-dihydrotriazolyl, $R_1$ represents a member of the group consisting of hydrogen and methyl, $R_2$ and $R_3$ represents members of the group consisting of hydrogen, methyl, ethyl, methoxy and ethoxy, Z represents a member of the group consisting of 2.3-hydroxynaphthoylamino, 6-bromo-2.3-hydroxynaphthoylamino, 2 - hydroxyanthracene-3-carbonylamino, 3-hydroxydiphenylene oxide-2-carbonylamino, 2-hydroxycarbazole - 3 - carbonylamino and 5-hydroxy-1.2.1'.2'-benzocarbazole-4-carbonylamino, and X represents a member of the group consisting of phenyl, methylphenyl, methoxyphenyl, ethoxyphenyl, chlorophenyl, nitrophenyl, dimethylphenyl, dimethoxyphenyl, methylmethoxyphenyl, methylchlorophenyl, methoxychlorophenyl, dimethoxychlorophenyl, naphthyl and methoxydiphenylene oxide radical.

2. The complex nickel compound of the water-insoluble azo-dyestuff having the formula

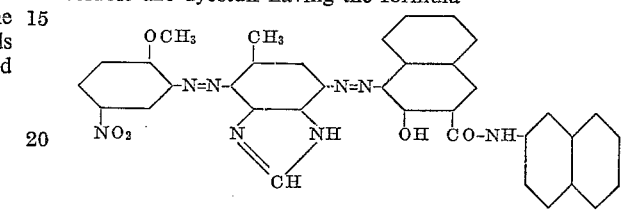

3. The complex nickel compound of the water-insoluble azo-dyestuff having the formula

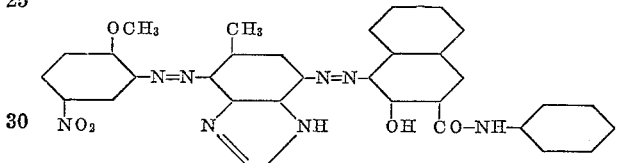

4. The complex nickel compound of the water-insoluble azo-dyestuff having the formula

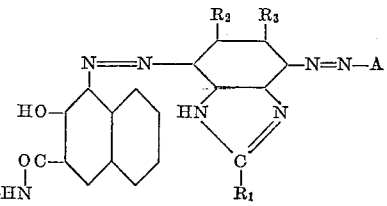

5. The complex nickel compound of the water-insoluble azo-dyestuff having the formula

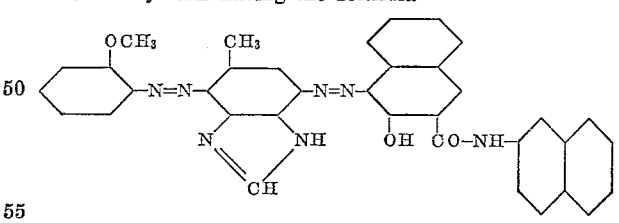

6. The complex copper compound of the water-insoluble azo-dyestuff having the formula

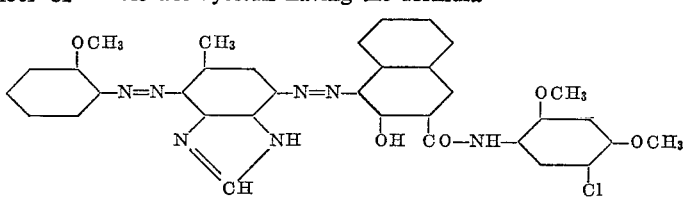

No references cited.